(12) United States Patent
Lantz et al.

(10) Patent No.: US 9,111,563 B2
(45) Date of Patent: Aug. 18, 2015

(54) VIBRATION CONTROL IN DATA STORAGE DEVICES

(71) Applicant: International Business Machines Corporation, Armonk, NY (US)

(72) Inventors: Mark A. Lantz, Rueschlikon (CH); Angeliki Pantazi, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/386,436

(22) PCT Filed: Mar. 5, 2013

(86) PCT No.: PCT/IB2013/051725
§ 371 (c)(1),
(2) Date: Sep. 19, 2014

(87) PCT Pub. No.: WO2013/144739
PCT Pub. Date: Oct. 3, 2013

(65) Prior Publication Data
US 2015/0049399 A1   Feb. 19, 2015

(30) Foreign Application Priority Data

Mar. 30, 2012 (GB) .................................. 1205685.9

(51) Int. Cl.
*G11B 5/584* (2006.01)
*G11B 5/596* (2006.01)
(Continued)

(52) U.S. Cl.
CPC .......... *G11B 5/59694* (2013.01); *G11B 5/5582* (2013.01); *G11B 5/584* (2013.01); *G11B 27/36* (2013.01)

(58) Field of Classification Search
None
See application file for complete search history.

(56) References Cited

U.S. PATENT DOCUMENTS

| | | | |
|---|---|---|---|
| 5,426,545 | A | 6/1995 | Sidman et al. |
| 6,407,876 | B1 | 6/2002 | Yamaguchi et al. |

(Continued)

FOREIGN PATENT DOCUMENTS

| | | |
|---|---|---|
| EP | 0969465 A1 | 1/2000 |
| JP | 2002251761 A | 9/2002 |
| JP | 2004145949 A | 5/2004 |

OTHER PUBLICATIONS

H. Fujimoto, et al., "Vibration Suppression and Optimal Repetitive Distrubance Rejection Control in Semi-Nyquist Frequency Region Using Multirate Sampling Control," 39th IEEE Conference on Decision and Control, 2000, pp. 3745-3750.

(Continued)

*Primary Examiner* — Wayne Young
*Assistant Examiner* — James L Habermehl
(74) *Attorney, Agent, or Firm* — Cantor Colburn LLP

(57) ABSTRACT

A storage device has a device body and a read/write head for reading and writing data in a data track of a storage medium. An actuator system is mounted on the device body for effecting movement of the read/write head relative to the data track to align the head with the data track. The actuator system has a plurality of degrees of freedom, and a controller controls the actuator system to effect the movement. A body vibration sensor provided on the device body generates a signal indicative of vibration of the body. An actuator vibration sensor generates a signal indicative of vibration of the actuator system. The controller is adapted to process the signals from the sensors to derive a coupling signal indicative of vibration coupling between the degrees of freedom, and to control the actuator system dependent on the coupling signal and the signal from the body vibration sensor.

14 Claims, 6 Drawing Sheets

(51) Int. Cl.
*G11B 5/55* (2006.01)
*G11B 27/36* (2006.01)

(56) References Cited

U.S. PATENT DOCUMENTS

| | | | |
|---|---|---|---|
| 6,496,323 B1* | 12/2002 | Umeda et al. | 360/78.09 |
| 6,674,600 B1 | 1/2004 | Codilian et al. | |
| 6,693,764 B1 | 2/2004 | Sheh et al. | |
| 6,710,966 B1 | 3/2004 | Codilian et al. | |
| 6,900,958 B1 | 5/2005 | Yi et al. | |
| 7,233,453 B2* | 6/2007 | Harada et al. | 360/75 |
| 7,268,970 B2* | 9/2007 | Anderson et al. | 360/77.12 |
| 7,468,857 B2 | 12/2008 | Hutsell et al. | |
| 7,508,614 B1 | 3/2009 | Sharma et al. | |
| 8,794,073 B2* | 8/2014 | Kasai et al. | 73/660 |
| 8,922,937 B1* | 12/2014 | Chahwan et al. | 360/75 |
| 2004/0080846 A1 | 4/2004 | Nakao | |
| 2010/0259851 A1 | 10/2010 | Yao et al. | |

OTHER PUBLICATIONS

K. Usui, et al., "Reduction of External Vibration in Hard Disk Drives Using Adaptive Feed-forward control with Single Shock Sensor," 9th IEEE International Workshop on Advanced Motion Control, 2006, pp. 138-143.

M.T. White, et al., "Increased Disturbance Rejection in Magnetic Disk Drives by Acceleration Feedforward Control and Parameter Adaptation," Control Eng. Practice, vol. 5, No. 6, pp. 741-751, 1997.

PCT International Search Report and Written Opinion; International Application No. PCT/IB2013/051725; International Filing Date: Mar. 5, 2013; Date of Mailing: Aug. 6, 2013; pp. 1-7.

Sang-Eun Baek, et al., "Vibration Rejection Control for Disk Drives by Acceleration Feedforward Control," IEEE, Proceedings of the 38th Conference on Decision and Control, Dec. 1999, pp. 5259-5262.

UK Intellectual Property Office, Application No. GB1205685.9; Patents Act 1977: Search Report under Section 17(5); Date of Mailing: Jul. 26, 2012; pp. 1-3.

Xinghui Huang, et al., "Design and Analysis of Computer Disk Drive Suspension Vibration Compensation Control," CML Report, Dec. 2002, pp. 1-7.

* cited by examiner

VIBRATION CONTROL IN DATA STORAGE DEVICES

NATIONAL STAGE PRIORITY

This is a U.S. national stage of application No. PCT/IB2013/051725, filed on Mar. 5, 2013. Priority under 35 U.S.C. §119(a) and 35 U.S.C. §365(b) is claimed from Great Britain Patent Application No. 1205685.9, filed Mar. 30, 2012, and all the benefits accruing therefrom under 35 U.S.C. §119, the contents of which in its entirety are herein incorporated by reference.

BACKGROUND

This invention relates generally to vibration control in data storage devices, and more particularly to tracking control under vibration conditions in such devices. Data storage devices are provided in which tracking control is adapted to counter effects of vibration.

In data storage devices such as tape drives and disk drives, an actuator system effects movement of the read/write head relative to a data track of the storage medium to align the head with the data track. A servo control system uses servo information read from the storage medium to control the actuator system so as to maintain head/track alignment during operation. In tape drives, for example, the servo control system typically corrects transversal position of the head relative to longitudinal data tracks on tape as well as rotational positioning to counter skew between the head and tape. Reliable operation of such storage devices requires robust performance of the servo control system under vibration conditions. Standard vibration profiles are typically used to describe the vibration specifications in terms of the acceleration input under which the storage device must continue to operate reliably. Demand for increased storage density makes it increasingly more challenging to meet the performance specifications under vibration conditions. In tape drives for example, increasing the tape track density tightens further the tolerance in the acceptable track-following error during read/write operations, so improved track-follow performance is needed to keep the additional track-follow margin required for reliable tape operation under vibration conditions at a minimum.

There are currently two main techniques for improving track-follow performance in vibration environments. A first technique employed in tape drives involves switching between two track-follow controllers. A high-bandwidth controller performs better during vibrations but is less reliable during normal operation. Therefore, upon detection of vibration, the tape drive switches from a low-bandwidth controller to the higher bandwidth controller. The main drawbacks of this scheme are that it relies on reliable detection of the onset of a vibration condition, and there is then a transient behavior during switching between the two controllers. It is also difficult to evaluate stability and performance because of the hybrid control scheme.

A second technique for dealing with vibration conditions uses accelerometers to measure the applied vibrations. Some implementations of this technique use an accelerometer mounted on the head actuator, e.g. as in the disk drives described in U.S. Pat. Nos. 6,407,876 and 5,426,545. Other implementations of this technique employ accelerometers mounted on the drive body rather than the actuator. Examples are described in U.S. Pat. No. 7,468,857 and "Increased disturbance rejection in magnetic disk drives by acceleration feedforward control and parameter adaptation", White and Tomizuka, Control Eng. Practice, Vol. 5, No. 6, pp. 741-751, 1997. Here the accelerometer information is utilized in a feedforward controller to correct the position of the actuator.

SUMMARY

According to an embodiment of an aspect of the invention there is provided a data storage device comprising:
a device body;
a read/write head for reading and writing data in a data track of a storage medium carried by the device body in use;
an actuator system mounted on the device body for effecting movement of the read/write head relative to the data track to align the head with the data track, the actuator system having a plurality of degrees of freedom for effecting said movement;
a controller for controlling the actuator system to effect said movement;
at least one body vibration sensor, provided on the device body, for generating a signal indicative of vibration of the body; and
at least one actuator vibration sensor, provided on the actuator system, for generating a signal indicative of vibration of the actuator system;
wherein the controller is adapted to process the signals from the body and actuator vibration sensors to derive at least one coupling signal indicative of vibration coupling between said degrees of freedom, and to control the actuator system in dependence on said at least one coupling signal and the signal from said at least one body vibration sensor.

Storage devices embodying this invention employ sensors, e.g. accelerometers, on both the device body and the actuator system. The signals from these sensors, indicative of vibration of the device body and the actuator system respectively, are processed by the controller to obtain at least one coupling signal which is indicative of vibration coupling between different degrees of freedom of the actuator system. This coupling signal is then used by the controller, together with the body vibration sensor signal(s), to control the actuator system to effect the head/track alignment. This is conveniently implemented via a combined feedforward control scheme as discussed further below. Thus, in embodiments of this invention, coupling effects between the different degrees of freedom of the actuator system can be estimated and accounted for by the servo control system. For instance, coupling effects between the transversal position and skew degrees of freedom in tape drives can be estimated in this way and addressed appropriately by the track follow controller. As a result, improved track-follow performance can be achieved under vibration conditions, permitting more reliable operation at increased storage densities.

The device body on which the body vibration sensor(s) is provided comprises the main portion of the device in relation to which the actuator system effects the head/track alignment movement. Of course, the body may itself comprise a number of constituent parts, such as frame and/or housing together with various other essentially fixed components in relation to which the head and/or storage medium are moved for alignment control.

The different degrees of freedom of movement of the actuator system will in general depend on the particular nature and design of the storage device, storage medium, head and actuator system. The particular number and placement of vibration sensors employed in a given system will similarly depend on system design. In a tape drive having translational and rotational degrees of freedom for the head/tape alignment movement, a single sensor on each of the body and actuator system may suffice as detailed below. However, additional sensors might be employed in systems with only two degrees of freedom, e.g. for improved accuracy/averaging purposes or to sense different motions in the different dimensions. Systems with more than two degrees of freedom and additional coupling effects can employ additional sensors to accommodate these additional parameters. The particular way in which the body and actuator sensor signals are processed to derive the desired coupling signal(s) can vary accordingly. However, the basic operating principles of devices embodying the invention are apparent from the description herein, and suitable implementations for a given system will be readily apparent to those skilled in the art.

The actuator system may in general comprise one or more constituent actuator mechanisms, e.g. for moving the head and/or storage medium with different levels of accuracy in a given degree of freedom for the alignment operation. Course and fine actuator mechanisms, for example, may be provided for any given dimension. In general, the actuator system might move the head and/or storage medium to effect the head/track alignment. Typically, however, the read/write head is mounted on the actuator system and the relative movement for head/track alignment is performed, at least in part, by movement of the head. For good estimation of coupling between different degrees of freedom in this case, the device preferably includes a first actuator vibration sensor located to sense vibration of the actuator system which is transferred to the head. This sensor thus provides a good measure of the vibration experienced by the head. The device also preferably includes a first body vibration sensor located on the body in the region of the head to sense vibration of the body which is transferred to the head. This sensor thus provides a good measure of the applied vibration. Other sensors may or may not be provided depending on device design as indicated above.

The controller may be adapted to derive a said coupling signal in dependence on the difference between the signal from a said actuator vibration sensor and the signal from a said body vibration sensor. Such a coupling signal may depend on this difference directly or indirectly, e.g. via a straightforward subtraction of signals or after processing of the signals in some way. In preferred embodiments the controller comprises feedforward control logic for generating a control signal for controlling the actuator system, the control logic being adapted to apply a first correction to the control signal dependent on the signal from a said body vibration sensor, and a second correction to the control signal dependent on a said coupling signal.

BRIEF DESCRIPTION OF THE SEVERAL VIEWS OF THE DRAWINGS

Preferred embodiments of the invention will now be described, by way of example, with reference to the accompanying drawings in which.

DETAILED DESCRIPTION

Figure 1:
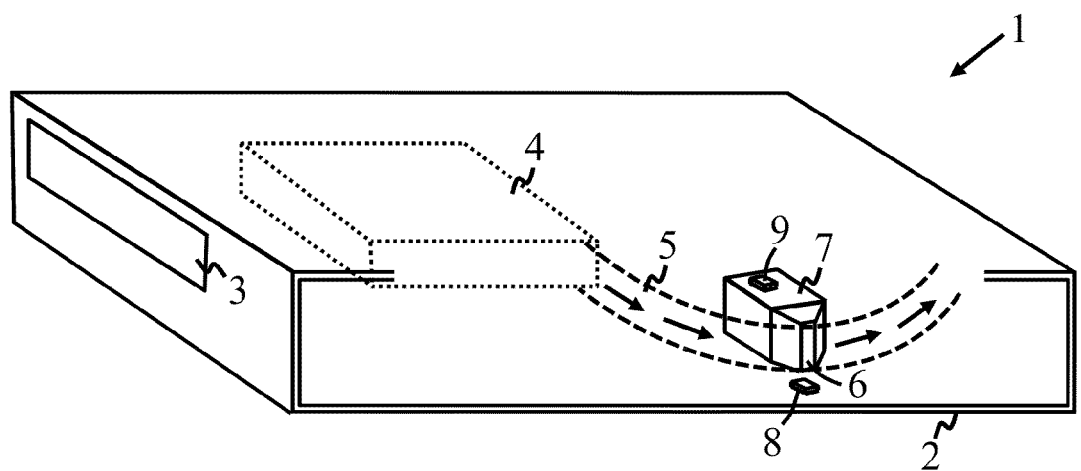
FIG. 1 is a schematic representation of a tape drive embodying the invention.

FIG. 1 is a simplified schematic of an exemplary tape drive embodying the invention showing key elements involved in the operation to be described. The drive 1 comprises a drive body 2 having a slot 3 for insertion of a tape cartridge indicated schematically at 4. In operation, a reel-to-reel and tape guide system (not shown) conveys the magnetic tape 5 from the cartridge 4 past a read/write head 6 for reading and writing data in longitudinal data tracks on the tape. The read/write head 6 is mounted on an actuator system 7 which is mounted in turn on device body 2. Two vibration sensors are provided in the drive 1 for sensing vibrations in operation. A body vibration sensor, in the form of accelerometer 8, is mounted on drive body 2 for generating a signal indicative of vibration of the drive body. An actuator vibration sensor, in the form of accelerometer 9, is mounted on the actuator system 7 for generating a signal indicative of vibration of the actuator system. The arrangement and function of accelerometers 8, 9 is discussed in more detail below.

Figure 2:
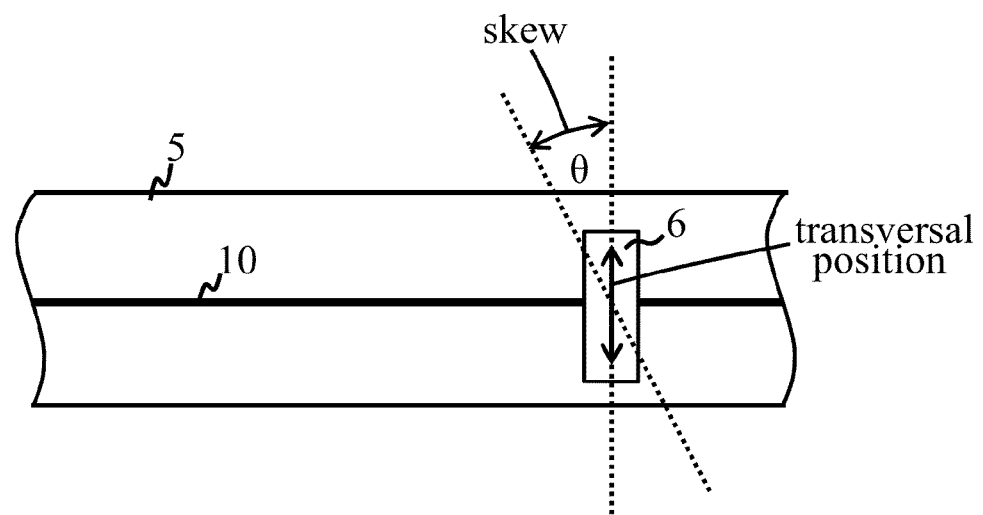
FIG. 2 indicates the two degrees of freedom of movement for head/tape alignment in the tape drive of FIG. 1.

The actuator system 7 of drive 1, which may be based, for example, on an IBM LTO (linear Tape Open) or enterprise magnetic tape drive, has two degrees of freedom for effecting movement of the head 6 relative to tape 5 to align the head with a data track. (IBM is trade mark of International Business Machines Corporation). In particular, actuator system 7 is operative to effect translational movement of the head 6, in a transversal direction relative to the longitudinal data track, and also rotational movement of the head 6 to counter skew between the head and tape. This is illustrated schematically in FIG. 2 which shows the head 6 arranged relative to a longitudinal data track 10 on tape 5. (In practice, head 6 typically includes multiple read/write elements for simultaneous read/write operations in multiple parallel data tracks on tape 5. To understand the system to be described, however, it suffices to consider operation in relation to a single track 10). Translational movement by the actuator system adjusts the transversal position of the head, perpendicular to the data track, as indicated. The rotational movement adjusts the angle θ between the head orientation and the transversal direction of the tape to address skew occurring between the head and tape in operation. The skew angle θ is ideally zero in operation. The transversal position and rotational (skew) adjustments are effected by respective actuators of actuator system 7 for moving the head 6. The individual actuator mechanisms are of generally known form and may themselves comprise plural actuators providing different levels of movement accuracy. The transversal position actuator, for instance, typically comprises a coarse actuator and a fine actuator for coarse and fine adjustments respectively.

Figure 3:
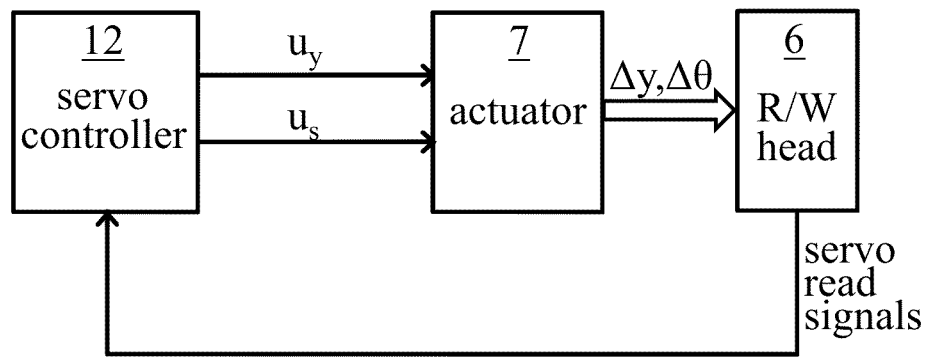
FIG. 3 is a schematic representation of a servo control system in the tape drive.

The drive 1 includes a servo control system for controlling the actuator system 7 (referred to simply as the "actuator" hereafter) to effect appropriate movement of the head 6 so as to maintain head/track alignment. The servo control system is indicated schematically in FIG. 3. During read/write operations, servo sensors on head 6 read information recorded in dedicated servo tracks on tape 5. The resulting servo read signals are received by a servo controller 12 which comprises control logic for implementing the transversal position and skew control functions. The servo controller 12 in this representation includes the servo channel for processing the servo read signals to obtain estimates of the current transversal position error and tape-to-head skew angle. The servo controller then generates control signals $u_y$ and $u_s$ for controlling the actuator 7 to effect appropriate corrections in the transversal position and skew degrees of freedom respectively.

Figure 4:
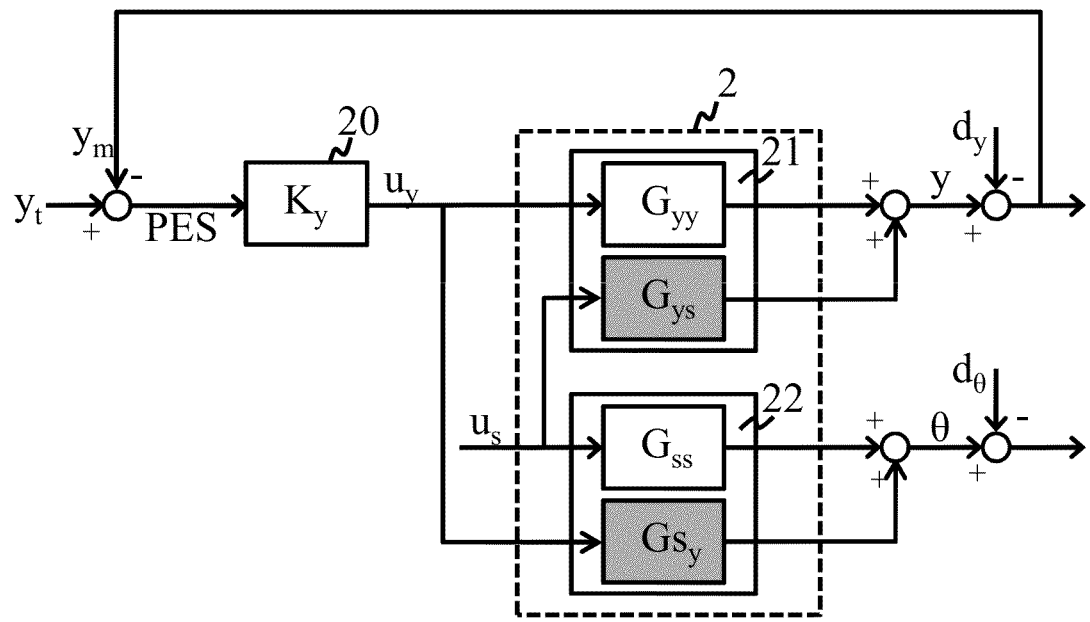
FIG. 4 illustrates coupling between the two degrees of freedom in the track-follow control system.
Figure 5:
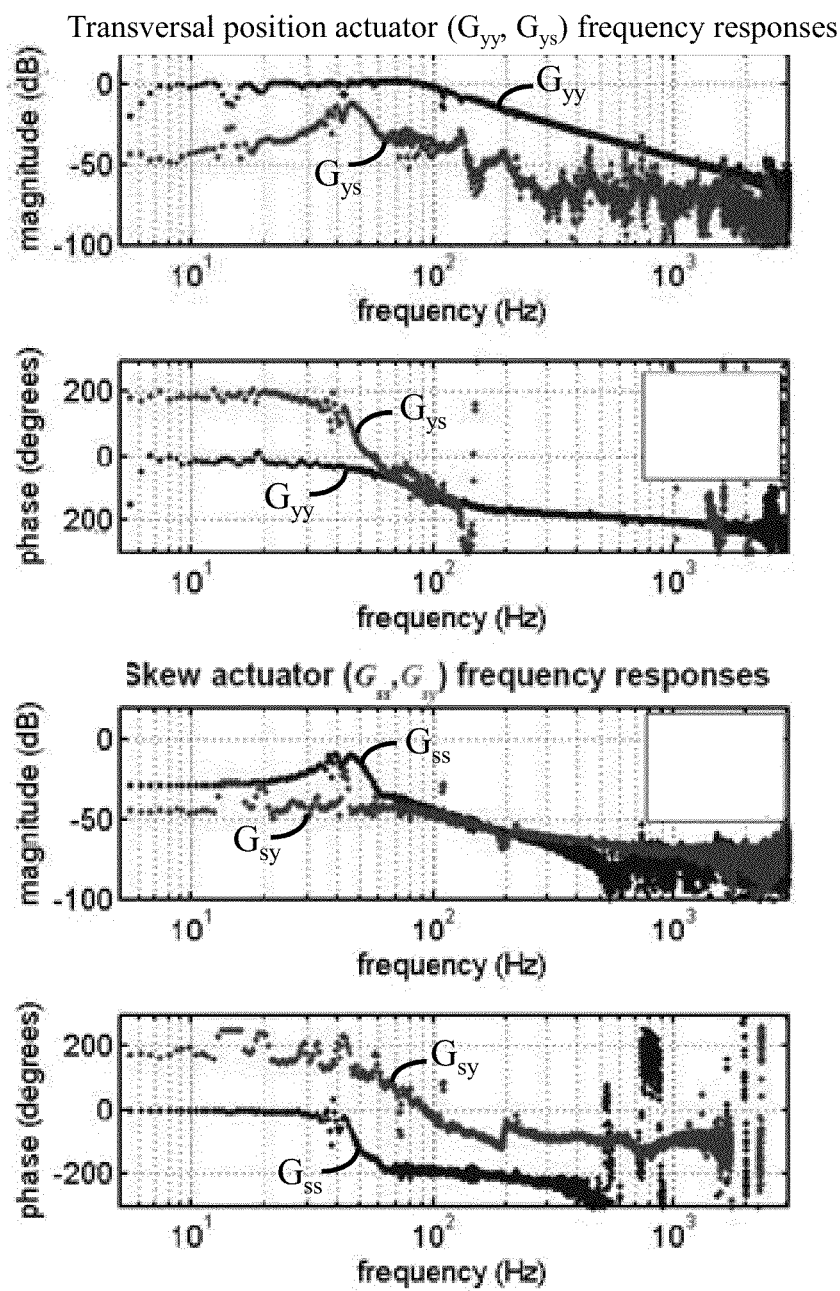
FIG. 5 shows frequency responses of the actuator mechanisms for each degree of freedom.

In an ideal system, the transversal position and skew degrees of freedom would be entirely independent, whereby movement in one dimension would be unaffected by movement in the other. However, in-drive actuator characterization shows that there is coupling between the two degrees of freedom. This is illustrated in FIG. 4 which is a schematic representation of the mechanical characteristics of the transversal position control system. Here, $K_y$ represents the transfer function of the transversal position (TP) control logic, represented by block 20, of servo controller 12. The TP controller 20 receives a positional error signal (PES) which is calculated in servo controller 12 from the measured transversal position $y_m$ of the head relative to the tape, as derived from the servo read signals, and the desired, or target, transversal position $y_t$. The characteristics of actuator 7, comprising TP actuator 21 and skew actuator 22, are represented in the figure by the four blocks labeled $G_{yy}$, $G_{ys}$, $G_{ss}$, and $G_{sy}$. $G_{yy}$ represents the transfer function of TP actuator 21 in response to the transversal position control signal $u_y$ from TP controller 20. $G_{ys}$ represents the transfer function of TP actuator 21 in response to the skew control signal $u_s$ produced by servo controller 12 in FIG. 3. The positional outputs of blocks $G_{yy}$ and $G_{ys}$ are summed to produce a transversal position y which is subject to disturbance $d_y$, caused by lateral tape motion in operation, to give the final transversal position of the head relative to the tape. The characteristics of skew actuator 22 in response to control signals $u_s$ and $u_y$ are similarly represented by transfer functions $G_{ss}$ and $G_{sy}$, giving a skew angle θ which is subject to disturbance $d_θ$ due to tape skew, to produce the final rotational position of the head relative to the tape. The shaded blocks $G_{ys}$ and $G_{sy}$ in this figure thus represent the coupling effects in actuator 7. The various transfer functions in FIG. 4 can be characterized by appropriate in-drive measurements, and the frequency responses obtained for such measurements in an exemplary drive 1 are shown in FIG. 5.

The servo control system in drive 1 must be adapted to cope with vibration experienced in operation of the drive, e.g. due to externally-applied vibrations or shocks or due to internal operation of parts of the drive itself. The accelerometers 8, 9 indicated in FIG. 1 are provided for this purpose, and the outputs of these accelerometers are used in a particular manner by the servo control system for highly effective vibration rejection. The vibration-rejection functionality is described in the following with particular reference to transversal position control in the servo system.

The body and actuator accelerometers 8, 9 are arranged on the body and actuator respectively so as to sense vibration in the transversal movement direction of head 6. In this particular embodiment, the accelerometers 8, 9 are MEMS (micro electro-mechanical systems) digital output "nano" accelerometers providing three-dimensional operation, having sensory axes in three orthogonal directions. The body accelerometer 8 is located on the drive body 2 in the region of the head 6, as indicated in FIG. 1, so as to sense vibration of the body which is transferred to the head. The output of the body accelerometer 8 thus provides a good measure of the applied vibrations which are propagated to the drive body close to the head position. The actuator accelerometer 9 is mounted on the actuator 7 so as to sense vibration of the actuator which is transferred to the head. Though shown on top of actuator 7 for ease of representation in FIG. 1, this accelerometer is preferably mounted on the bottom of the fine actuator mechanism of the transversal position actuator in this example. The output of the actuator accelerometer 9 thus provides a good measure of the total vibrations experienced by the actuator and propagated to the head.

Figure 6A:
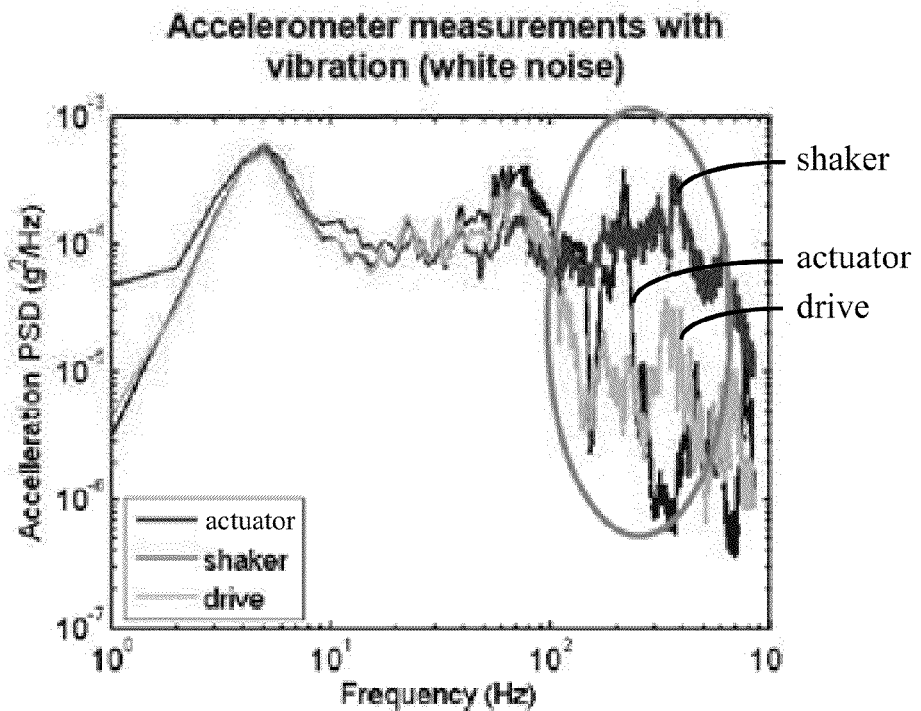
FIGS. 6a and 6b show results of measurements on the drive under vibration conditions.
Figure 6B:
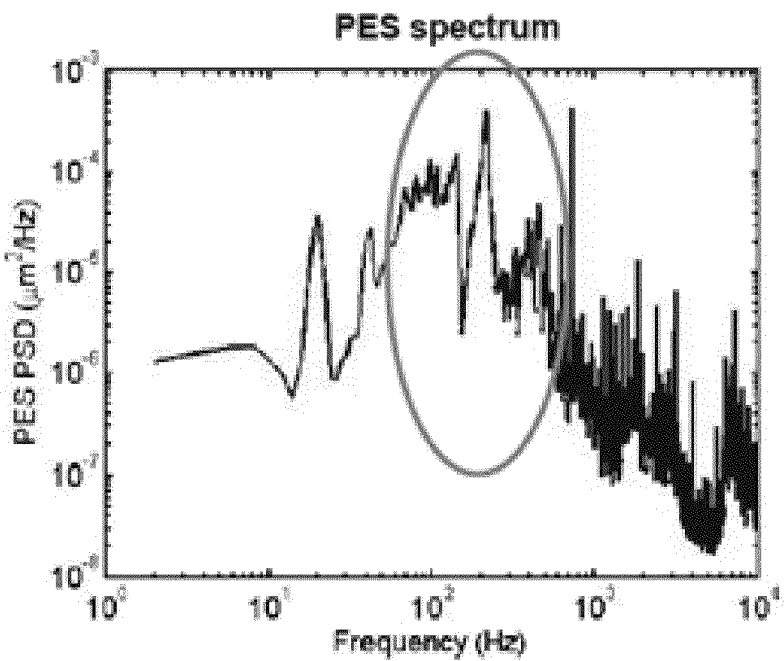

To illustrate the vibrational effects in drive 1, FIG. 6a shows a plot of acceleration PSD (power spectral density) versus frequency based on accelerometer measurements in an exemplary drive 1. The drive was mounted on a shaker, driven to vibrate the drive 1, on which a further accelerometer was mounted to measure the applied vibration. The three traces shown in FIG. 6a correspond to measurements from the shaker accelerometer ("shaker"), the body accelerometer 8 ("drive"), and the actuator accelerometer 9 ("actuator"). It can be seen that the body accelerometer 8 measures well the applied vibrations that are pronounced in frequencies up to about 100 Hz. The actuator accelerometer 9 also measures the additional effects on the actuator due to coupling between the skew and transversal position degrees of freedom discussed above. The effect of this vibration coupling also appears in the PES (positional error signal) spectrum at 100 to 200 Hz as illustrated in FIG. 6b.

Figure 7:
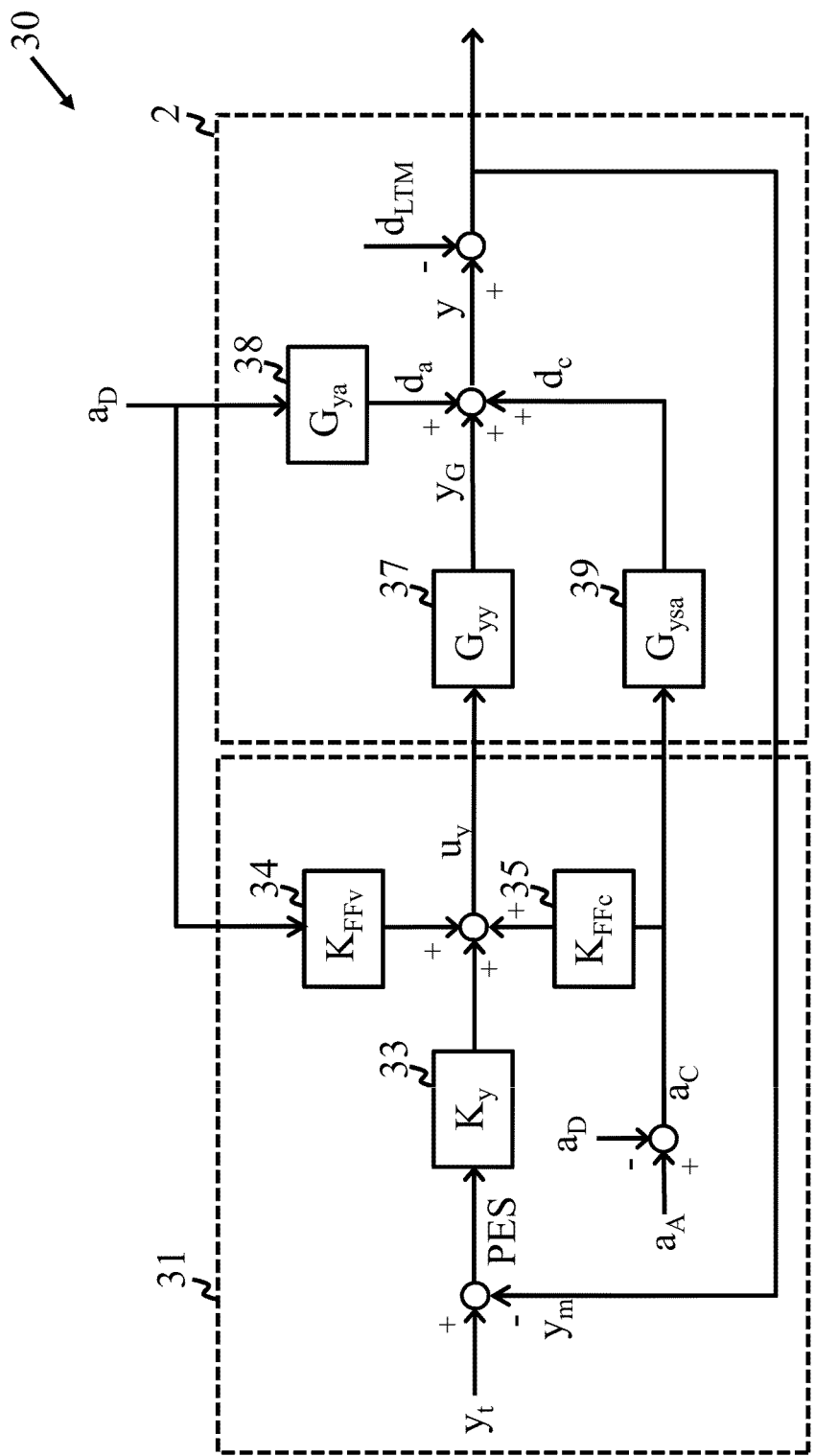
FIG. 7 is a schematic representation of a transversal position control system for the FIG. 1 drive.
Figure 8:
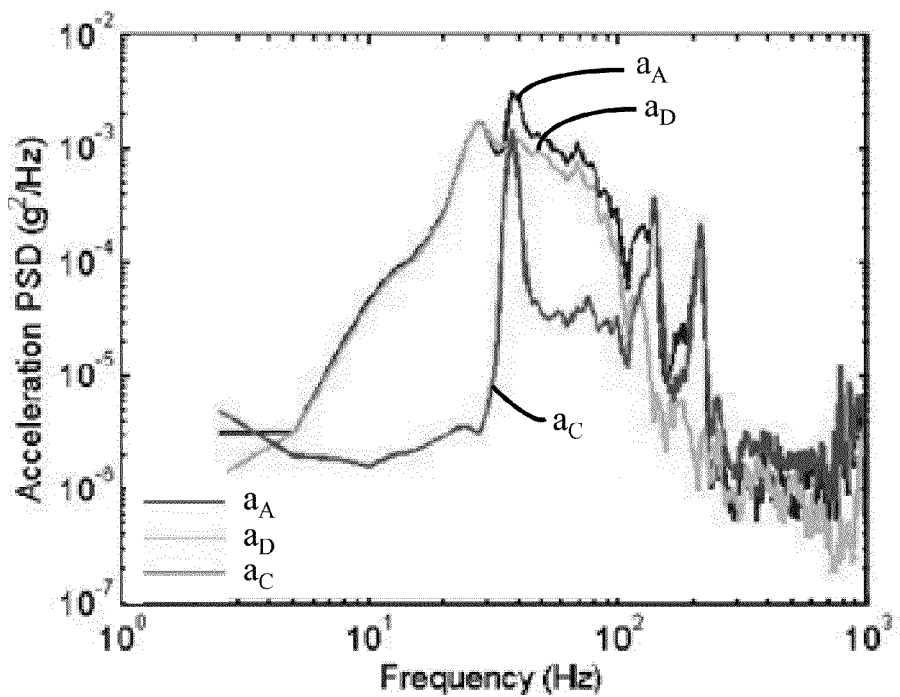
FIG. 8 shows measurements from vibration sensors employed in the FIG. 1 drive.

The servo controller in drive 1 processes the signals from the body and actuator accelerometers 8, 9 to provide vibration control which accounts for the coupling effects described above. FIG. 7 is a schematic block diagram characterizing the transversal position control system 30 under vibration conditions, indicating the form of the transversal position (TP) controller employed in servo controller 12 of FIG. 3. The TP controller, indicated generally at 31, comprises feedforward control logic for implementing a combined feedforward control scheme which accounts for the coupling effects. The TP controller 31 generates transversal position control signal $u_y$ for controlling movement of the head in the transversal direction by the actuator 7 as described above. The TP controller includes functional block 33, with transfer function $K_y$, implementing the basic transversal position control in response to the positional error signal PES as already described for FIG. 4. The controller 31 includes two further functional blocks 34 and 35, with transfer functions $K_{FFV}$ and $K_{FFc}$ respectively. Block 34 takes as input the acceleration signal $a_D$ output by body accelerometer 8 and applies a first correction to the control signal $u_y$ dependent on the signal $a_D$. Block 35 takes as input a coupling signal $a_C$ and applies a second correction to the control signal $u_y$ dependent on this coupling signal. The coupling signal $a_C$ is derived by controller 31 and is indicative of vibration coupling between the skew and transversal position degrees of freedom. In particular, controller 31 receives both the acceleration signal $a_D$ and the acceleration signal $a_A$ from the actuator accelerometer 9, and derives coupling signal $a_C$ in dependence on the difference between the two acceleration signals. In this simple example, the coupling signal $a_C$ is produced by straightforward subtraction of the body accelerometer signal $a_D$ from the actuator acceleration signal $a_A$. FIG. 8 shows the acceleration vs. frequency spectrum corresponding to signals $a_A$, $a_D$, and $a_C$ based on measurements in an exemplary drive 1. The resulting coupling signal $a_C$ provides a good measure of the vibration coupling effect on the actuator and head due to skew/transversal position coupling. Controller 31 thus controls the actuator 7 in dependence on the coupling signal $a_C$ and the body acceleration signal $a_D$ as well as the positional error signal PES.

The characteristics of actuator 7 in TP control system 30 are represented in FIG. 7 by blocks 37, 38 and 39 with transfer functions $G_{yy}$, $G_{ya}$ and $G_{ysa}$ respectively. $G_{yy}$ represents the basic transfer function of TP actuator 21 in response to the transversal position control signal $u_y$. $G_{ya}$ represents the transfer function of TP actuator 21 in response to the applied vibration as measured by accelerometer signal $a_D$. This results in adjustment $d_a$ to the transversal position output $y_G$ of block 37. $G_{ysa}$ represents the transfer function of TP actuator 21 in response to the vibration coupling effect represented by coupling signal $a_c$. This results in adjustment $d_c$ to the output $y_G$ of block 37. The resulting position y is subject to further disturbance $d_{LTM}$ due to lateral tape motion to give the final transversal position of the head relative to the tape.

The feedforward logic blocks 34 and 35 of controller 31 are designed to counter the effects of the applied vibration and the vibration coupling. To derive the functions $K_{FFv}$ and $K_{FFc}$, the transfer functions $G_{yy}$, $G_{ya}$ and $G_{ysa}$ of actuator blocks 37, 38 and 39 can be used. These transfer functions can be estimated based on in-drive measurements. Controller blocks 34 and 35 can then be designed based on the model of the transfer functions obtained with a required degree of accuracy, e.g. $K_{FFv} = -G_{yy}^{-1} G_{ya}$. In general, the functional logic blocks of controller 31 might be implemented in software or hardware or a combination thereof, e.g. via a combination of software and digital circuitry. Suitable implementations will be readily apparent to those skilled in the art. Digital circuits, e.g. based on digital filter circuitry of generally known form, can be readily designed to implement a desired transfer function.

Figure 9:
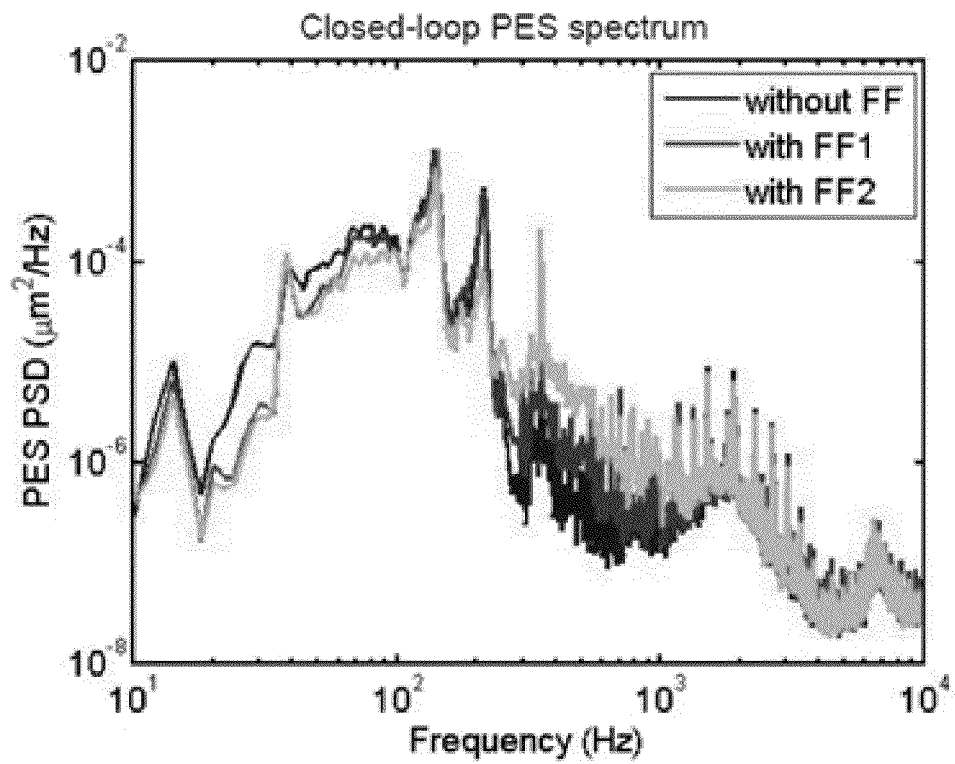
FIG. 9 indicates results obtained with the control system of FIG. 7.

In a basic implementation of controller 31, the feedforward control blocks 34 and 35 can be implemented simply as fixed gain amplifiers. FIG. 9 illustrates results for such an implementation employing transfer functions $K_{FFv} = -1$ and $K_{FFc} = +1$. The three traces shown in this figure compare the PES spectrum obtained in different control scenarios. The trace labeled "with FF2" indicates the results obtained employing controller 31 with $K_{FFv} = -1$ and $K_{FFc} = +1$. The trace labeled "with FF1" indicates the results obtained with only block 34 for feedforward control in controller 31, i.e. excluding the coupling term implemented by block 35 ($K_{FFv} = -1$ and $K_{FFc} = 0$). The trace labeled "without FF" indicates the results with no feedforward control ($K_{FFv} = 0$ and $K_{FFc} = 0$). The standard deviation of the positional error signal in each case is as follows:

| without FF | 194 nm |
|---|---|
| with FF1 | 186 nm |
| with FF2 | 155 nm. |

It can be seen that, even with such a simple implementation of terms $K_{FFv}$ and $K_{FFc}$, by accounting for coupling between the skew and transversal position degrees of freedom the combined feedforward control scheme of controller 31 provides a substantial improvement in PES performance. More complex implementations of control blocks 34 and 35 can be designed as required to provide a desired level of performance. In general, however, improved performance in terms of standard deviation of the PES signal can be expected as well as reduction in peak PES values which may result in stopping of read/write operations.

While operation has focused on transversal position control above, the combined feedforward control system can be implemented in like manner for the skew dimension to account for vibration coupling effects on the skew control system. In such an embodiment, for example, one sensing axis of accelerometers 8, 9 may be used to sense vibration in the transversal direction with the two further axes being used to sense rotational movements. Alternatively, additional accelerometers might be used for the rotational measurements. Some examples of other possible alternatives and modifications are given below.

While straightforward subtraction of accelerometer signals is used to derive the coupling signal above, in general the coupling signal could be derived after processing the body and actuator signals in some way, e.g. after weighting by applying particular gains to the signals or after an averaging process if plural signals are available from additional accelerometers.

While MEMS accelerometers are used in the preferred embodiment described, other sensors might in general be used to provide signals indicative of the vibrations to be measured. For instance, where the actuator system incorporates a voice coil movable in a magnetic field, movement of the coil due to vibration causes a back-emf to be induced in the coil, and this could be detected as a metric for the vibration.

While an implementation has been described for a tape drive, the combined feedforward control system can of course be applied in other storage devices, such as disk drives, where similar considerations apply. Systems with more than two degrees of freedom and additional coupling effects may employ additional sensors, and additional coupling signals may be derived and employed by the control system. In general, the number and placement of sensors employed in a given system may depend on the particular nature and design of the storage device, storage medium, head and actuator system, and the particular way in which the body and actuator sensor signals are processed to derive the desired coupling signal(s) can vary accordingly. Suitable implementations for a given system will be apparent to those skilled in the art.

It will be appreciated that many other changes and modifications can be made to the exemplary embodiments described without departing from the scope of the invention.

The invention claimed is:

1. A data storage device, comprising:
   a device body;
   a read/write head configured to read and write data in a data track of a storage medium carried by the device body in use;
   an actuator system mounted on the device body configured to effect movement of the read/write head relative to the data track to align the head with the data track, the actuator system having a plurality of degrees of freedom for effecting the movement;
   a controller configured to control the actuator system to effect the movement;
   a body vibration sensor, provided on the device body, configured to generate a signal indicative of vibration of the body; and
   a actuator vibration sensor, provided on the actuator system, configured to generate a signal indicative of vibration of the actuator system;
   wherein the controller is adapted to process the signals from the body and actuator vibration sensors to derive a coupling signal indicative of vibration coupling between the degrees of freedom, and to control the actuator system dependent on the one coupling signal and the signal from the body vibration sensor.

2. The data storage device of claim 1, wherein the controller is adapted to derive the coupling signal dependent on a difference between the signal from the actuator vibration sensor and the signal from the body vibration sensor.

3. The data storage device of claim 1 wherein the controller comprises feedforward control logic to generate a control signal for controlling the actuator system, the control logic being adapted to apply a first correction to the control signal dependent on the signal from the body vibration sensor, and a second correction to the control signal dependent on the coupling signal.

4. The data storage device of claim 1, wherein the read/write head is mounted on the actuator system.

5. The data storage device of claim 4, further comprising a first actuator vibration sensor located to sense vibration of the actuator system which is transferred to the head.

6. The data storage device of claim 5, further comprising a first body vibration sensor located on the body in the region of the head to sense vibration of the body which is transferred to the head.

7. The data storage device of claim 6, wherein the device is a tape drive and the actuator system is adapted to effect translational movement of the head in a transversal direction relative to a longitudinal data track on the tape and to effect rotational movement of the head relative to the data track to counter skew between the head and tape.

8. The data storage device of claim 7, wherein the actuator system is adapted to move the head to effect both the translational movement and the rotational movement.

9. The data storage device of claim 7, wherein the first actuator vibration sensor and the first body vibration sensor are arranged to sense vibration in the transversal direction.

10. The data storage device of claim 9, wherein the controller is adapted to derive a first coupling signal dependent on the difference between the signals from the first actuator vibration sensor and the first body vibration sensor.

11. The data storage device of claim 10, wherein the controller is adapted to derive the first coupling signal by subtracting the signal from the first body vibration sensor from the signal from the first actuator vibration sensor.

12. The data storage device of claim 10, wherein the controller comprises feedforward control logic to generate a transversal position control signal for controlling said movement in the transversal direction by the actuator system, the control logic being adapted to apply a first correction to the transversal position control signal dependent on the signal from the first body vibration sensor, and a second correction to the transversal position control signal dependent on the first coupling signal.

13. The data storage device of claim 5, wherein the first actuator vibration sensor comprises an accelerometer configured to generate a signal indicative of acceleration.

14. The data storage device of claim 6, wherein the first body vibration sensor comprises an accelerometer to generate a signal indicative of acceleration.

* * * * *